United States Patent
Tsuzuki et al.

[11] Patent Number: 5,972,474
[45] Date of Patent: Oct. 26, 1999

[54] AROMATIC POLYAMIDE AND/OR AROMATIC POLYIMIDE FILM AND MAGNETIC RECORDING MEDIUM HAVING SUCH A FILM AS A BASE

[75] Inventors: Toshihiro Tsuzuki, Kyoto; Masanori Sueoka; Nobuaki Itoh, both of Shiga, all of Japan

[73] Assignee: Toray Industries, Inc., Japan

[21] Appl. No.: 08/805,502

[22] Filed: Feb. 26, 1997

[30] Foreign Application Priority Data

Feb. 27, 1996 [JP] Japan .................................. 8-067205

[51] Int. Cl.$^6$ ...................................................... B32B 3/10
[52] U.S. Cl. ........................ 428/141; 428/143; 428/218; 428/323; 428/336; 428/474.4; 428/694 ST; 428/694 SL; 428/694 SG; 428/900
[58] Field of Search ..................................... 428/141, 218, 428/143, 336, 323, 474.4, 694 ST, 694 SL, 694 SG, 900

[56] References Cited

U.S. PATENT DOCUMENTS

| | | | |
|---|---|---|---|
| 4,818,581 | 4/1989 | Katoh ...................................... | 428/143 |
| 4,840,830 | 6/1989 | Sakamoto ................................ | 428/141 |
| 4,910,068 | 3/1990 | Takagi ..................................... | 428/141 |
| 5,139,849 | 8/1992 | Takagi ..................................... | 428/143 |
| 5,336,079 | 8/1994 | Okazaki ................................... | 428/323 |
| 5,516,574 | 5/1996 | Ogawa ..................................... | 428/143 |
| 5,556,691 | 9/1996 | Etchu ...................................... | 428/141 |

Primary Examiner—Leszek Kiliman
Attorney, Agent, or Firm—Austin R. Miller

[57] ABSTRACT

An aromatic polyamide and/or aromatic polyimide film suitable as a support in a magnetic recording medium excellent in runnability and scratch resistance and good in S/N ratio comprises an aromatic polyamide and/or aromatic polyimide as a main component, with particles present in the film, which film has characteristics which satisfy the following formulae:

$$10 \text{ nm} \leq dmax \leq 300 \text{ nm} \quad (1)$$

$$3 \leq \rho(dmax)/\rho(dmin) \leq 100 \quad (2)$$

or $$10 \text{ nm} \leq dmax \leq 300 \text{ nm} \quad (3)$$

$$3 \leq \rho(dmax)/\rho(d") \leq 100 \quad (4)$$

$$\rho(dmax)/\rho(dmin) > 100 \quad (5)$$

where dmax is the depth from a first surface of the film at which the particle density shows the first maximal value; dmin is the depth at which the particle density shows the first minimal or minimum value in a range from dmax to 1 μm from the said first surface; the linear differential coefficient of the particle density distribution curve has an inflection point at which the quadratic differential coefficient of the particle density distribution curve ia a negative, which inflection point occurs at a depth d", deeper than dmax, and within a range between the depth at which ρ(d) is ⅘ of ρ(dmax), and dmin; and ρ(d) is the particle density at each depth.

12 Claims, 1 Drawing Sheet

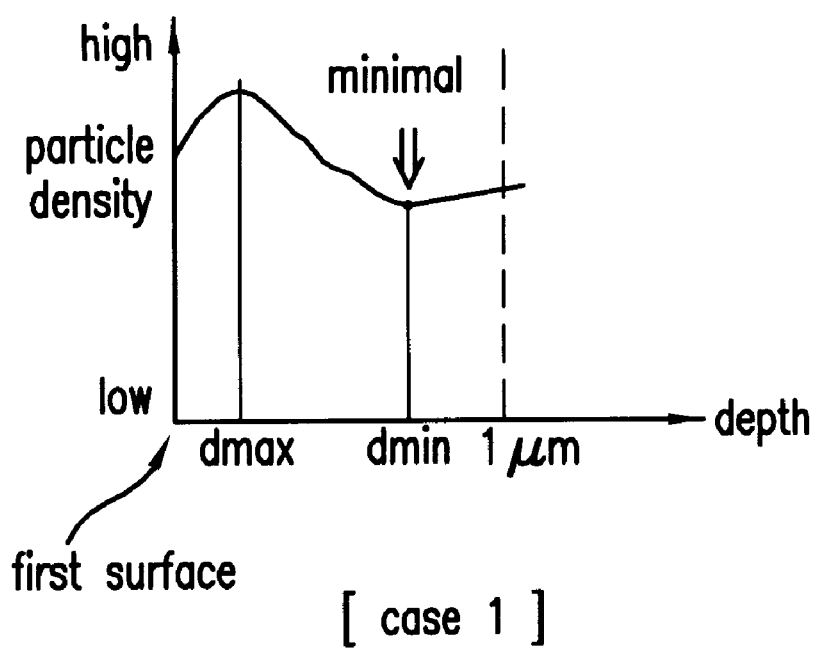

[ case 1 ]

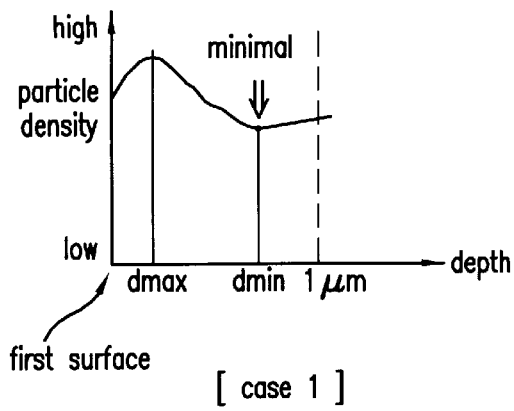

Fig. 1 [case 1]

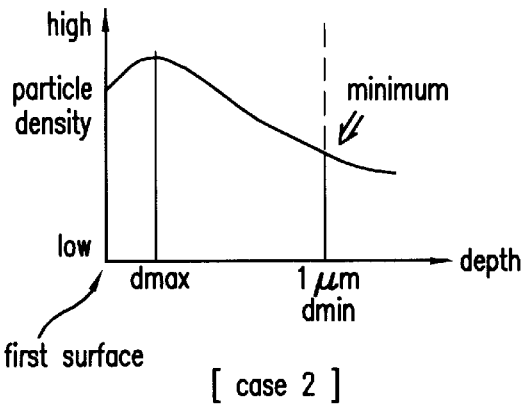

Fig. 2 [case 2]

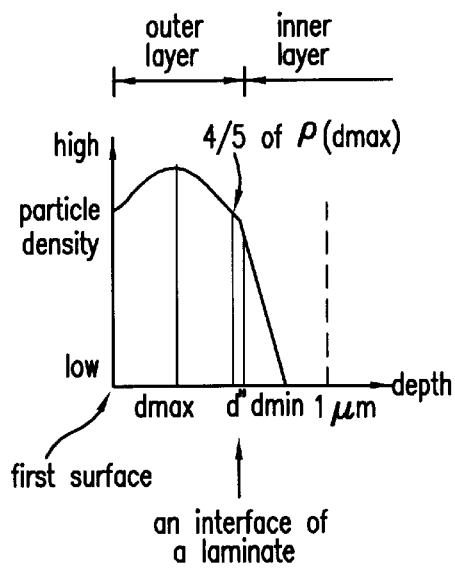

Fig. 3 [case 3]

$$\left( \begin{array}{c} \text{A laminate is formed by an outer layer containing particles and inner layer without particles} \\ \\ \dfrac{P(dmax)}{P(dmin)} = \infty \end{array} \right)$$

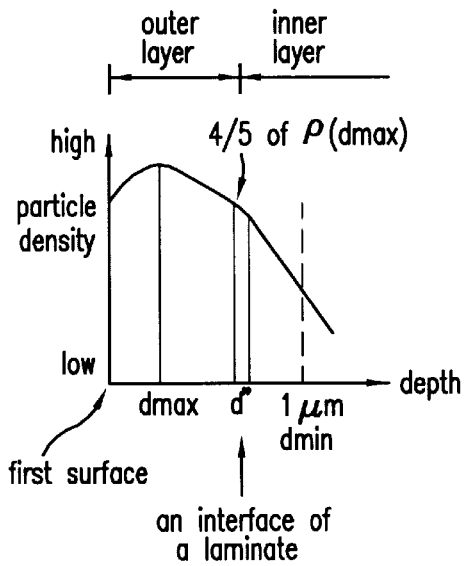

Fig. 4 [case 4]

$$\left( \begin{array}{c} \text{A laminate is formed by an outer layer containing particles and inner layer containing fewer particles than the outer layer} \\ \\ \dfrac{P(dmax)}{P(dmin)} > 100 \end{array} \right)$$

AROMATIC POLYAMIDE AND/OR AROMATIC POLYIMIDE FILM AND MAGNETIC RECORDING MEDIUM HAVING SUCH A FILM AS A BASE

The present invention relates to an aromatic polyamide and/or aromatic polyimide film which can be suitably used as a base film in a magnetic recording medium.

Aromatic polyamide and aromatic polyimide films have excellent heat resistance and mechanical properties. Hence, proposals have been made to use these films as base films of audio and video tapes. In this case, like the conventionally used polyester films, the films are required to possess both the slippabiliity characteristics necessary to avoid abrasion by a magnetic recording head and the smoothness characteristics for obtaining high output performance. To satisfy these properties simultaneously, it is effective for the aromatic polyamide and aromatic polyimide films to contain inactive particles. For example, such a technique is disclosed in JP-B-05-036849. Furthermore, laminate films, in which a layer which is limited in the ratio of the particle size to the layer thickness is present for more severe surface control, are disclosed in JP-A-03-114830, JP-A-03-119512 and JPA-04-006079.

In recent years, video cameras have been used outdoors more frequently, and there is demand for smaller size and longer recording time, and also for inexpensive thin magnetic recording media for computer data of large capacity, excellent durability even in severe conditions and with performance highly reliable in input/output characteristics.

However, if particles are simply incorporated at random into the aromatic polyamide or aromatic polyimide, only some of the particles present can be effectively used. Furthermore since the surface properties are not especially controlled, the film is too poor in durability and reliability to be applied as a base film for magnetic recording medium. On the other hand, the strict control of surface structure by forming a laminate film with a specific surface structure makes the production system complicated and tends to lower productivity, considering the solution casting used for forming the aromatic polyamide film or aromatic polyimide film. Furthermore, if particles that are different in kind or content are used in respective layers, or if different aromatic polyamides or aromatic polyimides are used in respective layers, the respective layers of the laminate film are naturally different in film formability, and the film may curl in a transverse direction. Hence, it is very difficult to obtain a film with a laminate structure as intended in the design.

The present invention addresses these problems, and seeks to solve them by providing an aromatic polyamide and/or aromatic polyimide film which has good surface properties, even if it is a single layer film, and can be suitably used as a base film for a magnetic recording medium having a high S/N ratio and excellent runnability, scratch resistance and shaving resistance.

To solve the above problems, in accordance with a first aspect, the present invention provides an aromatic polyamide and/or aromatic polyimide film which comprises an aromatic polyamide and/or aromatic polyimide as a main component, with particles contained in the said component, which film has characteristics which satisfy the following formulae:

$$10 \text{ nm} \leq dmax \leq 300 \text{ nm} \quad (1)$$

$$3 \leq \rho(dmax)/\rho(dmin) \leq 100 \quad (2)$$

where dmax is the depth from a first surface of the film at which the particle density shows a first maximal value; dmin is the depth from the said first surface at which the particle density shows a first minimal or minimum value in a range from dmax to 1 µm from the said first surface; and ρ(d) is the particle density at each depth.

According to a second aspect, the present invention provides an aromatic polyamide and/or aromatic polyimide film which comprises an aromatic polyamide and/or aromatic polyimide as a main component, with particles contained in the said component, which film has characteristics which satisfy the following formulae:

$$10 \text{ nm} \leq dmax \leq 300 \text{ nm} \quad (3)$$

$$3 \leq \rho(dmax)/\rho(d") \leq 100 \quad (4)$$

$$\rho(dmax)/\rho(dmin) > 100 \quad (5)$$

where dmax is the depth from a first surface of the film at which the particle density shows a first maximal value; dmin is the depth from the said first surface at which the particle density shows a first minimal or a minimum value in a range from dmax to 1 µm; the linear differential coefficient of the particle density distribution curve has an inflection point at which the quadratic differential coefficient of the particle density distribution curve is a negative, which inflection point occurs at a depth d", deeper than dmax, and within a range between the depth at which ρ(d) is ⅘ of ρ(dmax), and dmin; and ρ(d) is the particle density at each depth.

In this specification the reference to a "main component" means a component having a mol % amount no less than the mol % amount of any other component which may be present.

In a film of the present invention, the distribution of particle densities in the thickness direction near the surface of an aromatic polyamide and/or aromatic polyimide film is specified in order that protrusions which are uniform in height may be formed at a high density on the surface, and the particles of the surface region are not too close to the surface, so as to provide a film suitable for forming a magnetic recording medium high in S/N ratio and excellent in runnability and scratch resistance. Furthermore, because of these excellent properties, the runnability and scratch resistance during production of the magnetic recording medium are higher to assure higher productivity.

A magnetic recording medium according to the present invention comprises a magnetic layer formed on the above mentioned film on the said first surface of the film or on a second surface of the film opposite the first surface.

DESCRIPTION OF THE PREFERRED EMBODIMENTS

The aromatic polyamide used in a film of the present invention contains not less than 50 mol %, preferably not less than 70 mol %, of component units represented by the following general formula (I) and/or general formula (II).

where $Ar_1$, $Ar_2$ and $Ar_3$ stand for, respectively independently, those given in the general formulae (III), shown below, and X and Y in the general formulae (III) stand for, respectively independently, the following:

—O—, —CH$_2$—, —CO—, —SO$_2$—, —S— or —C(CH3)2—, but are not limited to the above. Furthermore, some of the hydrogen atoms on these aromatic rings may be substituted by groups such as halogen atoms (preferably, chlorine), nitro groups, alkyl groups with 1 to 3 carbon atoms (preferably, methyl groups), alkoxy groups with 1 to 3 carbon atoms and hydrogen atoms in the amide bonds constituting the polymer may also be substituted by substituent groups.

(III)

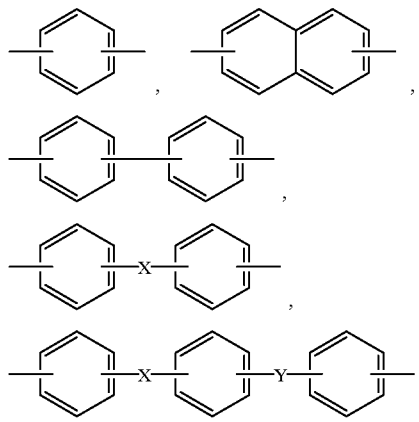

In the polyamide film according to the present invention, para-oriented aromatic rings may account for preferably 70% or more, more preferably 80% or more among all the above aromatic rings, in which case the film can have high rigidity and good heat resistance. The "para" orientation in this case means that the divalent main chain bonds connected to each aromatic ring are parallel to each other or axial. The aromatic rings, in which some hydrogen atoms on the aromatic rings are substituted by halogen atoms (preferably, chlorine), nitro groups, alkyl groups with 1 to 3 carbon atoms (preferably, methyl groups), alkoxy groups with 1 to 3 carbon atoms, etc., may account for 30% or more, preferably 50% or more among all the aromatic rings, in which case the behavior of the film in humid conditions and its mechanical properties such as rigidity can be desirably improved.

In a film the present invention, the aromatic polyamide may contain at least 50 mol % of the component units represented by the general formula (I) and/or general formula (II), and may have less than 50 mol % of other components such as aromatic polyimide components and other aromatic polyamide components copolymerized or blended.

The polyimide used in a film of the present invention may contain one or more aromatic rings and one or more imide rings in a component of the polymer, and preferably contains 50 mol % or more, more preferably 70 mol % or more of the component units represented by the following general formulas (IV) and/or (V).

(IV)

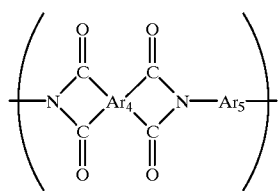

(V)

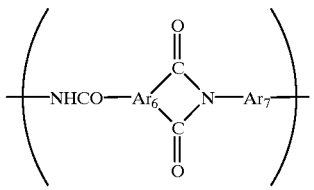

where $Ar_4$ and $Ar_6$ contain at least one aromatic ring respectively, and the two carbonyl groups forming an imide ring are connected with the carbon atoms adjacent to each other on the aromatic ring. The $Ar_4$ is derived from, an aromatic tetracarboxylic acid or its anhydride. Typical examples include those represented by the following general formulae (VI):

(VI)

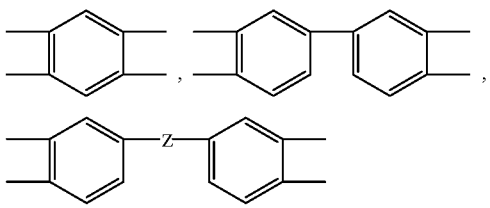

where Z can be selected from, though not limited to, —O—, —$CH_2$—, —CO—, —$SO_2$—, —S— and —$C(CH_3)_2$—. The $Ar_6$ is derived from a carboxylic anhydride or any of its halides. $Ar_5$ and $Ar_7$ can be selected from those represented by the following general formulae (VII), and X and Y in the general formulae (VII) can be selected from, though not limited to, —O—, —$CH_2$—, —CO—, —$SO_2$—, —S— and —$C(CH_3)_2$—. Furthermore, some of the hydrogen atoms on these aromatic rings can be substituted by such substituent groups as halogen atoms (preferably, chlorine), nitro groups, alkyl groups with 1 to 3 carbon atoms (preferably, methyl groups) and alkoxy groups with 1 to 3 carbon atoms. If the polymer contains amide bonds, the hydrogen atoms in the amide bonds may also be substituted by other substituent groups.

(VII)

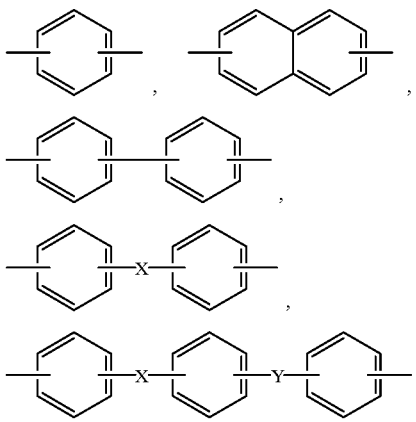

The aromatic polyimide in a film of the present: invention may contain at least 50 mol % of the component units represented by the general formula (IV) and/or general formula (V), and may have less than 50 mol % of other component units copolymerized and/or other blended components.

The film of the present invention further contains particles. The kinds of particle are not especially limited, and include inorganic particles of $SiO_2$, $TiO_2$, $Al_2O_3$, $CaSO_4$, $BaSO_4$, $CaCO_3$, carbon black, zeolite and other metal powders, and organic polymer particles such as silicone particles, polyimide particles, crosslinked copolymer particles, crosslinked polyester gains and teflon particles. For improved heat resistance, inorganic particles are preferable.

The average particle size of the particles contained in the film of the present invention (in most cases, the particles cohere, but a lower cohesion degree is preferable; monodispersed particles are also acceptable) is preferably 5 to 500 nn, more preferably 10 to 500 nm. The relative standard deviation of the particle size distribution is preferably 0.7 or less, more preferably 0.5 or less, so that strictly controlled surface properties can be obtained to assure excellent runnability and scratch resistance and a high S/N ratio.

The amount of particles contained in the film of the present invention is preferably 0.05 wt % or more, more preferably 0.1 wt % or more, and the upper limit is preferably 5 wt % or less, more preferably 3 wt % or less. If the particle content is smaller than this range, film runnability is likely to be lowered, and, on the contrary, if larger, the S/N ratio is likely to be poor.

Reference is for example now made to FIGS. 1–4, which show several multiple-section alternative particle distributions embodying the invention. Measured along a cross section of a film, from a surface of the film of FIGS. 1–4 the depth at which the particle density, in a section has a maximal value for the first time is designated dmax (see FIGS. 1–4). The value of dmax must be 10 to 300 nm. The lower limit is preferably 20 nm or more, and the upper limit is preferably 200 nm or less, more preferably 150 nm or less. If the dmax is so shallow as to be less than 10 nm, the particles come off easily from the film or are shaven off. If the dmax is so deep as to be more than 300 nm deep, the particles do not contribute to the surface properties of the film and the object of the present invention cannot be achieved. According to one aspect of the invention, if in comparing many cross sections, the depth dmax at a given section has a minimal value, as in FIG. 1 or has a minimum value as in FIG. 2, within the range extending from dmax of the film to 1 μm from the film surface is designated as dmin and if the particle density at each such depth is designated as ρ (d), then the following formula shall be satisfied in accordance with this invention.

$$3 \leq \rho(dmax)/\rho(dmin) \leq 100 \qquad (2)$$

A preferred formula is $5 \leq \rho(dmax)/\rho(dmin) \leq 100$ and a more preferred formula is $8 \leq \rho(dmax)/\rho(dmin) \leq 100$. If the ratio of ρ(dmax to ρ(dmin) is smaller than 3, runnability, and especially scratch resistance and shaving resistance may become poor. If larger than 100, the S/N ratio may become poor.

The distribution of particles as specified above, in which at least a proportion of the particles concentrates in a surface region of the film, is considered to have following significance.

The distance from the outermost film surface to the particles is kept small, but not so small that the particles are too close to the surface. Furthermore, if, as is preferred, particles that are equal in particle size are used, the protrusions can be rendered uniform in height. Since such particles are concentrated near the surface, as compared with a conventional film in which particles are uniformly dispersed entirely in the thickness direction of the film, the number of protrusions can be remarkably increased for the same particle content, to greatly increase the protrusion density. Furthermore, at the same time, uniformity of protrusion height can be enhanced. Moreover, the surface layer of the film can be hardened, in order to increase resistance against friction. These structural features are very highly effective upon the S/N ratio of the magnetic recording medium, and upon film runnability, scratch resistance and shaving resistance.

As is frequently observed in, for example, laminated film like FIGS. 3 and 4, the ratio ρ(dmax)/ρ(dmin) may exceed 100, in which case there is a depth of an inflection point d" deeper than dmax (see FIGS. 3 and 4), at which the quadratic differential coefficient of the particle density distribution curve shows a negative (and which depth d" occurs only within a range from the depth at which ρ(d") becomes ⅘ of ρ(dmax), and dmin). For example, this may occur when the inner layer of a laminate contains no particles (FIG. 3) or contains fewer particles than the outer layer (FIG. 4). In such cases, it is appropriate to use d" instead of the above dmin. That is, even when the following formula $$3 \leq \rho(dmax)/\rho(d") \leq 100 \qquad (4)$$

is satisfied, as in accordance with the aforementioned second aspect of the invention, the effects of the present invention can be obtained. A preferred formula is $5 \leq \rho(dmax)/\rho(d") \leq 100$ and a more preferred formula is $8 \leq \rho(dmax)/\rho(d") \leq 100$.

A film of the present invention may also have particle distribution characteristics of a second surface of the film opposite the said first surface, such that, at a depth Dmax from the second surface the particle density shows a first maximal value (if Dmax also satisfies the formulae (1) and (2) or the formulae (3) to (5), it is defined as $\rho(dmax) \geq \rho(Dmax)$), the following formula is preferably satisfied:

$$\rho(dmax)/\rho(Dmax) \geq 1.2,$$

and more preferably the formula $\rho(dmax)/\rho(Dmax) \geq 1.5$, still more preferable the formula $\rho(dmax)/\rho(Dmax) \geq 2$ is satisfied. If ρ(dmax)/ρ(Dmax) is in this range, the film used as a base film for a magnetic recording medium is particularly excellent in ruinnability and electromagnetic conversion characteristics.

The film of the present invention contains protrusions formed by the particles near at least one surface in the vicinity of which the particle distribution satisfies the formulae (1) and (2) or the formulae (3) to (5), The protrusions are preferably 5 nm or more, more preferably 10 nm or more, still more preferably 20 nm or more in average height h. The upper limit is preferably 100 nm or less, more preferably 50 nm or less. The relative standard deviation σ/h of the distribution of protrusion heights is preferably 0.7 or less, more preferably 0.6 or less, still more preferably 0.5 or less, ideally most preferably 0. The ratio $P_{1/3}$ of the number of protrusions with heights of ⅓ or less the average protrusion height on the surface to the total number of protrusions is preferably 20% or less, more preferably 15% or less, further more preferably 10% or less, ideally most preferably 0%. If these conditions are satisfied, the S/N ratio, runnability and scratch resistance can be very good.

In the film of the present invention, if there is a minimal particle density in the thickness range from dmax to 1 μm from at least one surface in the vicinity of which the particle distribution satisfies the formulae (1) and (2) or the formulae (3) to (5), that is, if there a portion of the film high in particle density near a surface of the film and also a portion high in particle density inside the film, then the film can be improved in bending rigidity and can be firm, to decrease desirably folding or wrinkling during running.

The film of the present invention contains the above compounds as the main components, but to the extent that the object of the present invention is not impaired, the film can also contain inorganic and organic additives such as an antioxidant, thermal stabilizer, lubricant, ultraviolet absorbent and nucleating agent blended.

The film of the present invention is preferably a single layer film since such films can be easily formed, but it can also be a laminated film. In general, when a laminated film is produced, a lamination pipe is used or a film is laminated onto another film already formed. In the former method, especially when different polymers are used for lamination, it is very difficult to strictly control the lamination ratio because of differences of flow characteristics. In the latter method, the equipment and process are complicated and productivity is low. Even if the film of the present invention is a single layer film, the surface is well controlled, and excellent surface properties can be simply obtained. Hence, the film can be suitably used as a single layer film or as a laminate behaving as a single layer film; i.e. a film obtained by laminating layers of the same polymer respectively containing almost equal amounts of the same particles. In this case, the kinds of polymer and the particles of each layer are the same and the distribution of particles fluctuates continuously and smoothly across the sectional direction, and the laminated film is substantially the same as a single layer film within the concept of the present invention.

The thickness of the film of the present invention is preferably 2 $\mu$m or more, more preferably 3 $\mu$m or more as the lower limit and preferably 50 $\mu$m or less, more preferably 20 $\mu$m or less, still more preferably 10 $\mu$m or less, especially preferably 6.5 $\mu$m or less as the upper limit. Especially when the film is as thin as 10 $\mu$m or less, the particle distribution in the film can be well controlled, to enhance the effects of the present invention. On the other hand, if its thickness is less than 2 $\mu$m, the strength is insufficient, and the film handling may be inconvenienced, depending on the application.

The aromatic polyamide and/or aromatic polyimide film of the present invention can be preferably used as the base film for making flexible printed circuit boards, capacitors, image transfer materials for thermal recording, acoustic vibration sheets and solar cells, and if the film has a magnetic layer formed at least on one surface, for use as a magnetic recording medium, the magnetic recording medium has excellent electromagnetic conversion characteristics and runnability. The magnetic recording medium can be used for digital video cassettes for residential and commercial use, professional use and broadcasting such as D-1, D-2 and D-3, and also for data storage such as DDS-2, 3, 4, data 8 mm and QIC. Above all, it is suitable for data storage.

The film of the present invention can be provided, for example, as a disc, card or tape, being not especially limited in form. Since the effects of the present invention can be remarkably revealed especially when the film is thin, the thickness as a substrate should be 6.5 $\mu$m or less, preferably 5 $\mu$m or less, still more preferably 4 $\mu$m or less, and as a tape, the width should be 2.3 to 13.0 mm and the length should be, 100 m or more per coil. Furthermore, since the present invention provides well controlled surface properties, the film can be preferably used as a long magnetic tape for high density recording with a recording density of 8 kilobytes/mm$^2$ or more, preferably 25 kilobytes/mm$^2$ or more, still more preferably 30 kilobytes/mm$^2$ or more in the non-compression mode. The recording density is obtained from the following formula:

Recording density=Recording capacity/(Tape length×Tape width)

The tensile Young's modulus of the film of the present invention at least in one direction at room temperature is preferably 7.8×10$^9$ Pa (800 kg/mm$^2$) or more, more preferably 8.8×10$^9$ Pa (900 kg/mm$^2$) or more, still more preferably 9.8×10$^9$ Pa (1000 kg/mm$^2$) or more, since the tape can withstand the tension acting when it is stopped during running or started for running. This can be achieved by using a para-oriented polymer or optimizing the stretching conditions during the film formation.

The elongation of the film of the present invention is preferably 10% or more, more preferably 20% or more, still more preferably 30% or more, since the film can have moderate flexibility.

The moisture absorption coefficient of the film of the present invention is preferably 5% or less, more preferably 3% or less, further still preferably 2% or less, since the film can be less dimensionally changed by temperature and can hold good electromagnetic conversion characteristics as a magnetic recording medium.

The thermal contraction coefficient of the film of the present invention when heated at 200° C. for 10 minutes is preferably 0.5% or less, more preferably 0.3% or less, since the magnetic recording medium prepared by using the film can be less dimensionally changed by temperature and can have good electromagnetic conversion characteristic.

It is desirable that the above respective properties are satisfied also in the case of a laminated film.

The film of the present invention can be produced, for example, by the following method, but the present invention is not limited thereto or thereby.

First of all, an aromatic polyamide can be polymerized, for example, by solution polymerization of an aromatic diacid chloride and an aromatic diamine in an aprotic organic polar solvent such as N-methylpyrrolidone, dimethylacetamide or dimethylformamide.

In this case, to inhibit the production of oligomer, the ingress of water and other materials which disturb the reaction should be avoided, and it is preferable to use an efficient stirring means. It is important to use raw materials by equivalents, but the ratio can be properly adjusted when the film formability may be impaired by the viscosity of the solution, etc. or when it is desired to adjust the particle distribution. Furthermore, to keep the solution homogeneous during polymerization, a monomer with a substituent group such as a halogen atom (preferably, chlorine), nitro group, alkyl group with 1 to 3 carbon atoms (preferably, methyl group) or alkoxy group with 1 to 3 carbon atoms on an aromatic ring, or a monomer with a flexible chain such as bisphenyl ether or bisphenylamine skeleton can be preferably used as far as the physical properties are not lowered. Moreover as a dissolving aid, calcium chloride, magnesium chloride, lithium chloride, lithium bromide or lithium nitrate, can, for example, also be added.

If an aromatic diacid chloride and an aromatic diamine are used as monomers, hydrogen chloride is byproduced, and if it is to be neutralized, an inorganic neutralizing agent such as a salt between cations of groups I or II of the periodic table and anions such as hydroxide ions or carbonate ions, or an organic neutralizing agent such as ethylene oxide, propylene oxide, ammonia, triethylamine, triethanolamine or diethanolamine can be used. Furthermore, to improve the characteristics of the base film under humid conditions, benzoyl chloride, phthalic anhydride, acetic acid chloride or aniline, can, for example, be added to the polymerization completed system to block the ends of the polymer.

On the other hand, the solution of an aromatic polyimide or aromatic polyamide acid can be obtained as described below. That is, an aromatic polyamide acid can be prepared by reacting an aromatic tetracarboxylic anhydride and an aromatic diamine with each other in an aprotic organic polar solvent such as N-methylpyrrolidene, dimethylacetamide or dimethylformamide. Furthermore, an aromatic polyimide can be prepared by heating a solution containing said aromatic polyamide acid, or adding an imidating agent such as pyridine, to obtain a polyimide powder and dissolving it again into a solvent. The polymer concentration in the raw solution for film formation is preferably about 5 to 40 wt %.

The polymer solution can be used as the raw solution for film formation as it is, or the polymer can be once isolated and re-dissolved into any of the organic solvents or an inorganic solvent such as sulfuric acid, to prepare the raw solution for film formation.

To obtain the film of the present invention, the inherent viscosity of the polymer (100 ml of a solution with 0.5 g of the polymer dissolved in sulfuric acid is measured at 30° C.) is preferably 0.5 or more. The polymer concentration in the raw solution for film formation is preferably about 2 to 40 wt %.

It is preferable to disperse the particles into a solvent having a viscosity of preferably 10 poises or less, more preferably 1 poise or less before addition, for homogeneous dispersion. If the particles are directly added to the polymer solution for film formation, the average particle size becomes large and the particle size distribution also becomes large to roughen undesirably the surface. The solvent used is preferably the same as the solvent used in the raw solution for film formation. However, unless the film formability is adversely affected, any other solvent can also be used. For dispersion, the particles are added into a solvent, and the dispersion is dispersed by, for example, a stirring type dispersion apparatus, ball mill, sand mill, or ultrasonic dispersion apparatus. The dispersion of the particles dispersed in this manner are added into the polymer solution. In this case, they may be added into the solvent before polymerization or added during preparation of the polymer solution, or immediately before casting.

The raw solution for film formation prepared as above is cast into a film. The solution casting can be effected by, for example, the dry-wet process, dry process or wet process. To achieve the object of the present invention, usually a dry-wet process or wet process is used.

For film formation by the dry-wet process, the raw solution is extruded onto a support such as a drum or endless belt, to form a thin film. From the thin film, the solvent is evaporated, and the film is dried at 80 to 250° C., preferably 80 to 200° C. within 60 minutes. In this case, the polymer concentration of the cast film and the viscosity of the film is important for effectively achieving the present invention. It is effective to keep the polymer concentration of the cast film low or to keep the viscosity low for a longer time. In this regard, the viscosity of the raw solution to be extruded is preferably as low as possible but not so low that castability is impaired, and as a means for achieving this, the degree of polymerization or polymer concentration can be lowered for adjustment. However, it is preferable to heat for keeping the viscosity at 2000 poises or less for effecting extrusion. Furthermore, preheating the support is effective for obtaining the film of the present invention, and the preheating temperature is −30° C.~+100° C. of the temperature of the raw solution for film formation, preferably not lower than the temperature of the raw solution and not higher than the temperature at which the vapor pressure of the solvent becomes 300 mm Hg or less. Heating during drying is effective, but since as drying progresses the polymer concentration rises, drying stepwise to cause the particles easily to be concentrated near but not too close to the surface, and this is effective for achieving the object of the present invention. It is also effective to keep the film for a while under slightly lower temperature after preliminary drying, and then to raise the temperature for completing the drying. If the cast film is thinner, that is, if the final film is thinner, heat and material transfer can occur more effectively, to preferably obtain the effects of the present invention. On the other hand, if the drying temperature exceeds 250° C., the surface is roughened to make the film improper for use to form a magnetic recording medium. The drum or endless belt used in the drying step is desirably as smooth as possible. After completion of drying, the film is removed from the support and introduced into a salt and solvent removing step for removing salts, solvent, etc. In the salt and solvent removing step, to achieve the object of the present invention, salts and solvent are removed in as gentle a manner as possible. For the bath used for solidifying and removing salts and solvent, it is good to use a mixed solvent consisting of a solidifying solvent and a good solvent such as the polymerization solvent. Furthermore, it is preferable that a plurality of solidifying and salt and solvent removing baths with a gradient of mixing ratio are used, so that the film may be passed through such baths positioned in descending order of solvent power one after another. Furthermore, it is more preferable that these baths have a temperature gradient, so that the film may be passed through such baths positioned in descending order of temperature one after another. Then, the film is stretched, dried and heat-treated to be provided as a final film.

For film formation by the wet process, the raw solution is extruded from a die onto a support such as a drum, to form a thin film which is introduced into a solidifying bath. For casting, as described for the above dry-wet process, it is preferable that the support is preheated as in the case of the dry-wet process, and it is also preferable that the raw solution is also preheated when extruded. It is also preferable that if treatment by water vapor, etc. is effected after casting, the treatment is carried out at a temperature as high as possible, and that further heating (preferably 100° C. or higher) is effected subsequently.

For the solidifying bath, it is effective to use a mixed solvent consisting of a good solvent such as the polymerization solvent and a poor solvent such as water, as in the solidifying and salt and solvent removing step of the above dry-wet process. In addition, a bath prepared by adding an inorganic salt such as calcium chloride, magnesium chloride, lithium chloride, lithium bromide or lithium nitrate instead of the good solvent, to the poor solvent can also be used. If a poor solvent only is used, the exchange between the solvent in the raw solution for film formation and the poor solvent of the solidifying bath occurs suddenly, and it is difficult to obtain the film of the present invention. The film is then stretched, dried and heat-treated to be provided as a final film.

To obtain the film of the present invention, control during the stretching step is important. It is effective that the stretching temperature is in a range from the glass transition point (Tg) of the polymer to (Tg+30° C.), and that stretching is effected under swelling, preferably with heating. The stretching ratio is preferably in a range from 1.2 to 8.0, more preferably 1.2 to 4.0 in area ratio (the area ratio being defined as the value obtained by dividing the film area after stretching by the film area before stretching; less than 1 means relaxing). If the area ratio is smaller than 1.2, the physical properties and surface properties of the film are lowered, and if larger than 8.0, the particles in the film are likely to appear on the surface, to roughen the film surface, adversely affecting the S/N ratio.

The stretching degree is not especially limited, but considering such properties as elongation and tear resistance, it is practical to stretch to satisfy the following formula:

$$0.5 \leq E_{MD}/E_{TD} \leq 2$$

where $E_{MD}$ is the tensile Young's modulus in the longitudinal direction and $E_{TD}$ is the tensile Young's modulus in the transverse direction.

During or after film stretching, heat treatment is effected. The heat treatment temperature is preferably in a range from 200 to 350° C.

Furthermore, it is effective to gradually cool the film after stretching or heat treatment at a rate of 50° C./sec or less.

The film of the present invention has good surface properties even if it is a single layer film, but it can also be a laminated film. In the case of a laminated film, for example in the case of a two-layer laminate, the polymerized aromatic polyamide solution is divided into two parts, and particles are added to the respective parts; then the respective mixtures are laminated. Also in the case of three or more layers, a similar method is adopted. The lamination can be achieved by using any conventional method, for example by laminating in a die or in a lamination pipe, or laminating a layer onto another layer already formed.

To form a magnetic recording medium, a magnetic layer is formed on the film. The magnetic layer can be formed by applying a dispersion with a magnetic powder dispersed in a binder, vapor-depositing or sputtering or ion-plating a ferromagnetic metal, or any other method. For example, a wet method can be adopted and a magnetic powder, binder, organic solvent, etc. are mixed and dispersed with other necessary ingredients, to prepare a magnetic coating material, and the magnetic coating material is applied onto the film. The magnetic powder is not especially limited, but for example, $\gamma$-$Fe_2O_3$, $Fe_3O_4$, $CrO_2$, Fe, Co, Fe—Co, Fe—Co—Ni or Co—Ni can be preferably used. As the binder, a thermosetting resin based binder or radiation setting binder is preferable. For example, vinyl chloridevinyl acetate resin, polyurethane resin or isocyanate compound can be used. As the organic solvent, any one, or more as a mixture, of methyl isobutyl ketone, cyclohexane, ethyl acetate, tetrahydrofuran, dioxane, toluene and xylene can be used. Other additives which can be used include a dispersing agent, lubricant and an antistatic agent. A gravure roll is preferably used for the application of the magnetic layer to achieve uniform coating of the film. The drying temperature after coating is preferably 90° C. to 150° C. Furthermore, calendering is preferably effected in a temperature range from 25° C. to 150° C.

The surface obtained according to the present invention can be improved in such properties as S/N ratio, runnability, scratch resistance and shaving resistance. Therefore, if a magnetic layer is formed on the surface in conformity with the present invention, high electromagnetic conversion characteristic and high scratch resistance can be obtained. If a magnetic layer is formed on the surface opposite to the surface in conformity with the present invention, the runnability and shaving resistance can provide large effects. Preferably the requirements of the present invention are satisfied at both surface portions of the film. In this case, if $\rho(dmax) \geq \rho(Dmax)$, it is preferable to form the magnetic layer on the surface where dmax is obtained.

On the side opposite to the magnetic layer, a back coat layer can be formed by any conventional method, to further enhance runnability. Furthermore, the film coated with the magnetic layer may be cured and processed into the magnetic recording medium of the present invention.

The magnetic recording medium obtained in this manner can record a large volume of data in its compact body since it can be reduced in size and thickness. It can be suitably used for video and audio tapes, and especially also as a digital recording medium such as a data tape of a computer, since it may be made to be less dimensionally changed by humidity and temperature. Furthermore, since it is excellent in runnability and electromagnetic conversion characteristic at high temperature and high humidity, it can also be suitably used as a tape of a video camera used outdoors.

Moreover, since the aromatic polyamide and/or aromatic polyimide film of the present invention has both excellent heat resistance and good runnability, it can also be used as a film substrate of TAB mounted board, an image transfer material for thermal recording, and even for such applications as in a film capacitor.

EXAMPLES

The methods for measuring physical properties and the methods for evaluating respective effects in the present invention are described below.

(1) Tensile Young's Modulus, Strength and Elongation

A Tensilon tensile testing machine type UTM-III (produced by Tokyo Sokki) was used for measurement at a tensile speed of 300 mm/min, and at 20° C. and 60% relative humidity using test pieces of 10 mm in width and 50 mm in length.

(2) Average Particle Size of Particles

A section of a film was photographed and observed using a transmission electron microscope (TEM), to detect particles. At least 100 particles in the photo were numerically processed by an image analyzer, and the number average diameter D was identified as the average particle size.

$$D = \Sigma Di/N$$

(where Di is the circle equivalent diameter of a particle, and N is the number of particles.) The relative standard deviation $\sigma/D$ was obtained from the following formula:

$$\sigma/D = (\Sigma(Di-D)^2/(N-1))^{1/2}/D$$

(3) Particle Density of Surface Layer

A secondary ion mass spectrometer (SIMS) was used to analyze the density in the thickness direction on both the sides of a film, by identifying the density ratio of the element highest in density among the elements attributable to the particles in the film, to the carbon element of the aromatic polyamide and/or aromatic polyimide, as the particle density. Measuring conditions were as stated below.

Measuring instrument:

Secondary ion mass spectrometer (SIMS)
A-DIDA3000 produced by Atomika, Germany

| Measuring conditions | |
|---|---|
| Primary ion species | $O_2^+$ |
| Primary ion energy | 12 keV |
| Primary ion current | 100 nA |
| Raster area | 200 × 200 μm |
| Gate rate | 30% |
| Analyzed area | 60 × 60 μm |

-continued

| Measuring conditions | |
|---|---|
| Detected secondary ions | Positive ions |
| Electronic spray condition | 0.8 kV-3.0 A (F5) |
| Vacuum degree during measurement | 3 × 10$^{-8}$ Torr |
| H-Q-H | #14 |

In the case of particles made of an organic material, etc. difficult to measure by SIMS, infrared spectroscopy by whole reflection made and confocal microscope are also effective for measuring the particle density.

(4) Heights and Height Distribution of Surface Protrusions

A two detectors equipped scanning electron microscope (SEM) [ESM-3200 produced by Elionics K.K.] and a section measuring instrument [PSM-1 produced by Elionics K.K.] were used to measure the heights of protrusions on the film surface, with the height of a flat surface as 0, and the measured heights were sent to an image processor [IBAS2000 produced by Carl Zeiss K.K.], to reproduce the film surface protrusion image on the processor. Then, on the surface protrusion image, each protrusion was converted to digital data, to obtain its protrusion area, and from it, an average diameter of the protrusion was identified as a diameter of a circle of which area is equal to the protrusion area. Furthermore, the highest value in the digital data of the each protrusion was identified as a height of the protrusion. Thus, the diameters and heights of individual protrusions were obtained. This measurement was repeated 500 times at different places, to obtain the number of protrusions, and the average value of the heights of all the measured protrusions was identified as the average height. Furthermore, based on the heights of individual protrusions, the standard deviation of height distribution was obtained. The relative standard deviation refers to the value obtained by dividing the standard deviation by the average height. As the magnification of the microscope, any value between 1000 to 8000 times was selected. As the case may be, the height information obtained by a high resolution light interference type three-dimensional surface analyzer (TOPO-3D produced by WYKO; objective 40 to 200 times; it is effective to use a high resolution camera) and an atomic force microscope (e.g., Nanoscope III produced by Digital Instrument) can also be used instead of the above SEM values.

(5) S/N Ratio

A magnetic coating material composed as listed below was prepared and applied on a film on the side not in contact with the metallic belt or drum when the film was formed, to have a thickness of 2 $\mu$m by a gravure roll, and after the magnetic layer was dried, the laminate was calendered.

| | |
|---|---|
| Magnetic powder (metallic powder) | 80 parts by weight |
| Polyvinyl chloride copolymer | 10 parts by weight |
| Polyurethane | 10 parts by weight |
| Hardening agent | 5 parts by weight |
| Abrasive | 5 parts by weight |
| Toluene | 100 parts by weight |
| Methyl ethyl ketone | 100 parts by weight |

The film coated with the magnetic layer was slit at a width of ½ inch, and the tape was installed in a VTR cassette for use as a VTR tape. The tape was made to record 100% chroma signals generated by a test wave generator for TV, and after the tape was run 100 times, using a home use VHS type VTR, the chroma S/N ratio was measured by a color video noise measuring instrument. The atmosphere was 25° C. and 55% RH (relative humidity), For evaluation, a marketed tape was referred to.

(6) Runnability

The VTR tape obtained by the above method was run 100 times using a home use VHS type VTR at 40° C. at 60% RH, to observe the disorder in tape running and the fluctuation and noise of the image.

⊚; Smooth running and no fluctuation at all on the output image.

x; Fluctuation and noise occurred on the output image.

(7) Scratch Resistance

In an atmosphere of 40° C. and 60% RH, a ½-inch wide tape was run around a guide pin of 6 mm in outer diameter at an angle of θ=π/2 (rad) at an inlet tension of T1=200 g at a speed of 1000 m/min, and the film was vapor-deposited with aluminum on the surface, to observe the number and width of flaws and white powdering by a differential interference microscope. A tape with no flaw at all and with little white powdering was expressed by ⊚; a tape with less than 3 flaws and with little white powdering, by ○; and a tape with 3 or more flaws with white powdering, by x. A scratch resistance level of ⊚ is desirable, but a level of ○ allows practical use without any problem.

Embodiments of the present invention will now be described below in more detail with reference to the following Examples. In these Examples, respective abbreviations stand for the following: NMP=N-methylpyrrolidone, TPC=terephthalic acid dichloride, CTPC=2-chloroterephthalic acid dichloride, PPDA=paraphenylenediamine, CPA=2-chloroparaphenylenediamine, DPE=3,4'-diaminodiphenyl ether.

Example 1

Into dehydrated NMP, 85 mol % of CPA and 15 mol % of DPE were dissolved, and 98.5 mol % of CTPC was added. The mixture was stirred for 2 hours for polymerization, and subsequently lithium carbonate was added for neutralization.

Separately, into separately dehydrated NMP, 20 wt % of silica of 16 nm in primary particle size was added, and dispersed by an ultrasonic dispersion apparatus for 10 hours, and the mixture was filtered. This dispersion of inorganic particles was added to the above polymer solution, to achieve an inorganic particle content of 2 wt % based on the weight of the polymer.

The polymer solution was fed through a 5 $\mu$m cut filter, and while being kept at 70° C. (the viscosity of the solution at this temperature was 800 poises), it was cast on a 100° C. stainless steel belt with a mirror finished surface. After the cast film was conveyed for a while so as not to be allowed quenching, and was then heated at first by 150° C. air and then 180° C. air respectively for 1 minute, to evaporate the solvent. The film capable of retaining its form was continuously removed from the belt, and introduced into water baths kept at 40° C. with an NMP concentration difference (positioned in descending order of concentration of NMP one after another), to extract the remaining solvent and the inorganic salts produced by neutralization. During this extraction, the film was stretched to 1.2 times in the longitudinal direction. Then, the film was dried to remove water and heat-treated by a tenter, to obtain a 5 $\mu$m thick aromatic polyamide film. During the heat treatment, the film was stretched to 1.3 times at 280° C. in the transverse direction, and dried and heat-treated at 250° C. for 1.5 minutes, then being gradually cooled at a rate of 20° C./sec. The film was 1250 kg/mm$^2$ in tensile Young's modulus, 42 kg/mm$^2$ in strength and 30% in elongation respectively in both the longitudinal and transverse directions. Furthermore, the film was processed into a magnetic tape, and evaluated according to the methods described before. The results are shown in Table 1. All of the S/N ratio, runnability and scratch resistance were found to be good.

Example 2

Into dehydrated NMP, 100 mol % of CPA was dissolved as an aromatic diamine, and 100 mol % of 3,3',4,4'-benzophenonetetracurboxylic dianhydride was added to the solution, for polymerization, to obtain an aromatic polyamide acid solution.

To the solution, as described in Example 1, $TiO_2$ of 40 nm in primary particle size dispersed in NMP was added to achieve a particle content of 1.2 wt % based on the weight of the polymer.

Subsequently, a catalyst was added to the polymer solution, and the mixture was fed through a 5 $\mu$m cut filter. The filtrate was cast on a 60° C. stainless steel belt with a mirror finished surface. After the cast film was conveyed for a while so as not to be allowed quenching, and was then heated at first by 120° C. air and then 150° C. air respectively for 3 minutes, to evaporate the solvent, and the film capable of retaining its form was continuously removed from the belt, and introduced into water baths kept at 40° C. with an NMP concentration difference (positioned in descending order of concentration of NMP one after another), to extract the remaining solvent. Then, the film was stretched to 1.05 times in the longitudinal direction, and dried to remove water and heat-treated by a tenter, to obtain an 8 $\mu$m thick aromatic polyimide film. During the heat treatment, the film was stretched at 300° C. to 1.1 times in the transverse direction, and heat-treated at 420° C. for 5 minutes, for amide acid ring closure reaction, then being gradually cooled at a rate of 20° C./sec.

The film was 820 kg/mm$^2$ in tensile Young's modulus, 35 kg/mm$^2$ strength and 22% in elongation respectively in both the longitudinal and transverse directions. The film was processed into a magnetic tape, and evaluated according to the methods described before. The results are shown in Table 1. All of the S/N ratio, runnability and scratch resistance were found to be good.

Example 3

Into dehydrated NMP, 90 mol % of CPA and 10 mol % of DPE were dissolved, and 98.5 mol % of CTPC was added to the solution. The mixture was stirred for 2 hours for polymerization, and subsequently lithium carbonate was added for neutralization.

The solution was divided into two parts, and into one of the parts, silica of 16 nm in primary particle size dispersed in NMP was added as described in Example 1 by 2 wt % based on the weight of the polymer. This raw solution is called raw solution A, and the raw solution not containing particles is called raw solution B.

These polymer solutions were kept at 70° C. and supplied to a die by three extruders, and laminated in three layers of raw solution A/raw solution B/raw solution A in the die, being cast on a 100° C. stainless steel belt with a mirror finished surface. The extruded amounts were adjusted to form a final film with a total thickness of 7 $\mu$m consisting of 0.5 $\mu$m layer (the layer farthest from the belt), 4.5 $\mu$m layer and 2 $\mu$m layer in this order. The polymer solution laminate was conveyed for a while so as not to be allowed quenching, and was then heated at first by 160° C. air and then 180° C. air respectively for 1 minute, to evaporate the solvent, and the film capable of retaining its form was continuously removed from the belt, and introduced into water baths kept at 40° C. with an NMP concentration difference (positioned in descending order of concentration of NMP one after another), to extract the remaining solvent and the inorganic salts produced by neutralization. During the extraction, the film was stretched to 1.2 times in the longitudinal direction. Subsequently, the film was dried to remove water and heat-treated by a tenter, to obtain a 7 $\mu$m thick aromatic polyamide film. During the heat treatment, the film was stretched at 280° C. to 1.3 times in the transverse direction, and dried heat-treated at 250° C. for 1.5 minutes, then being gradually cooled at a rate of 20° C./sec.

The film was 1280 kg/mm$^2$ in tensile Young's modulus, 42 kg/mm$^2$ in strength and 25% in alongation respectively in both the longitudinal and transverse directions. Furthermore, the film was processed into a magnetic tape, and evaluated according to the methods described before, and the results are shown in Table 1. The particle density showed the maximal value at 30 nm from the surface, and gradually declined, declining greatly at about 580 nm, to reach 0. All of the S/N ratio, runnability and scratch resistance were found to be good.

Example 4

Into dehydrated NMP, 85 mol % of CPA and 15 mol % of DPE were dissolved, and 99.5 mol % of CTPC was added. The mixture was stirred for 2 hours for polymerization, and subsequently lithium carbonate was added for neutralization.

Then, silica, without being dispersed in NMP beforehand, was added as a powder into the solution before polymerization to achieve a particle content of 2wt % based on the weight of the polymer. Subsequently, a 5 $\mu$m thick aromatic polyamide film was obtained as described in Example 1, except that a 100° C. stainless steel belt was heated at first by air at 160° C. after having been conveyed for a while so as not to be allowed quenching.

The film was processed into a magnetic tape, and evaluated according to the methods described before, and the results are shown in Table 1. The average particle size and relative standard deviation of particles became large, to roughen the surface as compared with the film produced in Example 1. Hence, the S/N ratio and scratch resistance somewhat declined, but were still practical.

A magnetic layer was formed on the belt side of the base film, to obtain similarly a magnetic tape. Though the S/N ratio somewhat declined, the runnability and scratch resistance greatly improved.

Comparative Example 1

A 5 $\mu$m thick aromatic polyamide film was obtained as described in Example 1, except that the film was dried by heating at 130° C. for 8 minutes. The film was processed into a magnetic tape, and evaluated according to the methods described before, and the results are shown in Table 1. A zone of high concentration of the particles existed too close to the surface of the film, and some particles were nearly exposed on the surface, to roughen the surface, thus greatly lowering the S/N ratio. The scratch resistance was also low.

Comparative Example 2

Into dehydrated NMP, 85 mol % of CPA and 15 mol % of DPE were dissolved, and 99.5 mol % of CTPC was added. The mixture was stirred for 2 hours for polymerization, and subsequently lithium carbonate was added for neutralization. In addition, particles were added as in Example 1.

Subsequently, a 5 μm thick aromatic polyamide film was obtained as described in Example 1, except that the polymer solution was cast on a stainless steel belt without preheating and that the film was dried by heating at 200° C. for 2 minutes.

The film was processed into a magnetic tape, and evaluated according to the methods described before, and the results are shown in Table 1. Since an insufficient density ratio ρ(dmax)/ρ(dmin) of the particles existed in the surface region, the runnability and scratch resistance declined.

Comparative Example 3

Into dehydrated NMP, 45 mol % of CPA, 45 mol % of 3,3'-dimethylbenzidine and 10 mol % of DPE were dissolved, and 98.5 mol % of CTPC was added. The mixture was stirred for 2 hours for polymerization and lithium carbonate was added for neutralization.

Subsequently as described in Example 1, silica of 16 nm in primary particle size dispersed in NMP was added to achieve a particle content of 2 wt % based on the weight of the polymer.

The polymer solution was fed through a 5 μm cut filter, and cast on a drum with a mirror finished surface, then introduced into water. A film capable of retaining its form was continuously removed from the drum, and the solvent and the inorganic salts produced by neutralization were extracted with water. During the extraction, the film was stretched to 1.2 times in the longitudinal direction, and subsequently dried to remove water and heat-treated by a tenter, to obtain a 5 μm thick aromatic polyamide film. During the heat treatment, the film was stretched at 280° C. to 1.3 times in the transverse direction, and dried and heat-treated at 200° C. for 2 minutes, then gradually cooled at a rate of 20° C./sec.

The film was processed into a magnetic tape, and evaluated according to the methods described before, and the results are shown in Table 1. Since an insufficient density ratio ρ(dmax)/ρ(dmin) of particles existed in the surface region and since, in any event, the maximum density of particles occured at a depth dmax too remote from the surface, the S/N ratio, runnability and scratch resistance declined.

Comparative Example 4

Into dehydrated NMP, 40 mol % of PPDA and 60 mol % of DPE were dissolved, and 98.5 mol % of TPC was added to the solution. The mixture was stirred for 2 hours for polymerization, and lithium carbonate was added for neutralization.

Subsequently as described in Example 1, silica of 16 nm in primary particle size dispersed in NMP was added to achieve a particle content of 2 wt % based on the weight of the polymer.

The polymer solution was fed through a 5 μm cut filter, and while kept at 60° C., it was cast on a stainless steel belt at room temperature with a mirror finished surface, and heated at 180° C. for 3 minutes, to evaporate the solvent. A film capable of retaining its form was continuously removed from the belt, and introduced into water baths at room temperature, to extract the remaining solvent and the inorganic salts produced by neutralization with water. During the extraction, the film was stretched to 1.4 times in the longitudinal direction. Subsequently, the film was dried to remove water and heat-treated by a tenter, to obtain a 5 μm thick aromatic polyamide film. During the heat treatment, the film was stretched at 280° C. to 1.5 times in the transverse direction, and dried and heat-treated at 250° C. for 1.5 minutes, then gradually cooled at a rate of 20° C./sec.

The film was 610 kg/mm$^2$ and 690 kg/mm$^2$ in tensile Young's modulus, 30 kg/mm$^2$ and 35 kg/mm$^2$ in strength, and 38% and 31% in elongation respectively in the longitudinal direction and the transverse direction. The film was processed into a magnetic tape, and evaluated according to the methods described before, and the results are shown in Table 1. In the film, an insufficient density ratio ρ(dmax)/ρ(dmin) of particles existed in the surface region, and the runnability and shaving resistance were insufficient. The S/N ratio did not improve either. Furthermore, since the tape was low in Young's modulus, it was found to be deformed like a wakame sea weed after completion of testing.

Example 5

Polymerization and neutralization were carried out by the same procedure as in Example 1. Separately, into separately dehydrated NMP, 20 wt % of silica of 25 nm in primary particle size was added, and dispersed by a high-pressure dispersion apparatus and an ultrasonic dispersion apparatus, and the mixture was filtered. This solution of inorganic particles was added into the above polymer solution before polymerization, to achieve an inorganic particle content of 1.8 wt % based on the weight of the polymer.

The polymer solution was fed through a 5 μm cut filter, and while being kept at 70° C., it was allowed to cast on a 100° C. stainless steel belt with a mirror finished surface. The cast film was conveyed for a while so as not to be allowed quenching for twice as long as in Example 1, and was then heated at first by 120° C. air for 2 minutes and then by 180° C. air for 1 minute, to evaporate the solvent. The film capable of retaining its form was continuously removed from the belt, and introduced into water baths kept at 40° C. with an NMP concentration difference (positioned in descending order of concentration of NMP one after another), to extract the remaining solvent and the inorganic salts produced by neutralization. Then the film was heated and stretched to 1.2 times in the longitudinal direction. Then, the film was dried to remove water and heat-treated by a tenter, to obtain a 5 μm thick aromatic polyamide film. During the heat treatment, the film was stretched to 1.3 times at 280° C. in the transverse direction, and dried and heat-treated at 250° C. for 1.5 minutes, and then gradually cooled at a rate of 20° C./sec.

The film was 1200 kg/mm$^2$ in tensile Young's modulus, 38 kg/mm$^2$ in strength and 30% in elongation in both the longitudinal and transverse directions. Furthermore, the film was processed into a magnetic tape, and evaluated according to the methods described before. The results are shown in Table 1. The S/N ratio, runnability and scratch resistance were found to be extremely good.

Example 6

Into dehydrated NMP, 85 molt of CPA and 15 mol % of DPE were dissolved, and 100 mol % of CTPC was added. The mixture was stirred for 2 hours for polymerization, and subsequently lithium carbonate was added for neutralization.

Separately, into separately dehydrated NMP, 20 wt % of silica of 25 nm in primary particle size was added, and dispersed by an ultrasonic dispersion apparatus for 10 hours, and the mixture was filtered. This dispersion of inorganic particles was added to the above polymer solution, to achieve a particle content of 2 wt % based on the weight of the polymer. The polymer solution was fed through a 5 μm cut filter, and while kept at 70° C., it was cast on a 130° C. stainless steel belt with a mirror finished surface. The cast film was conveyed for a while so as not to be allowed quenching, and was then heated at first by air at 150° C. and then by air at 180° C. respectively for 1.5 minutes, to evaporate the solvent. The film capable of retaining its form was continuously removed from the belt, and introduced into water baths kept at 40° C. with an NMP concentration difference (positioned in descending order of concentration of NMP one after another), to extract the remaining solvent and the inorganic salts produced by neutralization. During this extraction, the film was stretched to 1.2 times in the longitudinal direction. Then, the film was dried to remove water and heat-treated by a tenter, to obtain a 11 μm thick aromatic polyamide film. During the heat treatment, the film was stretched to 1.3 times at 280° C. in the transverse direction, and dried and heat-treated at 250° C. for 1.5 minutes, and then gradually cooled at a rate of 20° C./sec.

Furthermore, the film was processed into a magnetic tape, and evaluated according to the methods described before. The results are shown in Table 1. The S/N ratio, runnability and scratch resistance were found to be good although slightly unfavorable results were seen for the runnability.

Example 7

Into dehydrated NMP, 45 mol % of CPA, 45 mol % of 3,3-dimethylbenzidine, and 10 mol % of DPE were dissolved, and 99 mol % of CTPC was added. The mixture was stirred for 2 hours for polymerization, and subsequently lithium carbonate was added for neutralization.

Separately, into separately dehydrated NMP, 20 wt % of silica of 25 nm in primary particle size was added, and dispersed by an ultrasonic dispersion apparatus for 10 hours, and the mixture was filtered. This solution of inorganic particles was added to the above polymer solution, to achieve a particle content of 2 wt % based on the weight of the polymer.

The polymer solution was fed through a 5 μm cut filter, and while kept at 70° C., it was cast on a 60° C. stainless steel belt with a mirror finished surface. The cast film was conveyed for a while so as not to be allowed quenching, and the film, which was held on a belt, was fed into water baths with a temperature gradient and an NMP concentration difference (positioned in descending order of concentration of NMP one after another). Finally, the solvent and the inorganic salts resulting from the neutralization were removed completely by means of a water bath. Subsequently the film, while being heated, was stretched to 1.2 times in the longitudinal direction. Then, the film was dried to remove water and heat-treated by a tenter, to obtain a 5 μm thick aromatic polyamide film. During the heat treatment, the film was stretched to 1.3 times at 280° C. in the transverse direction, and dried and heat-treated at 250° C. for 1.5 minutes, and then gradually cooled at a rate of 20° C./sec.

The film was processed into a magnetic tape, and evaluated according to the methods described before. The results are shown in Table 1. All of the S/N ratio, runnability and scratch resistance were found to be good, although the yield of the magnetic tape was slightly inferior.

Comparative Example 5

Polymerization and neutralization were carried out by the same procedure as in Example 1. The solution was divided into two parts, and into one of the parts, silica of 16 nm in primary particle size dispersed in NMP was added as described in Example 1 to achieve a particle content of 2 wt % based on the weight of the polymer. This raw solution is called raw solution A, and the raw solution not containing particles is called raw solution B.

These polymer solutions were fed through a 5 μm cut filter and, while being kept at 70° C., supplied to a die by three extruders. Then they were laminated in three layers of raw solution A/raw solution B/raw solution A in the die and allowed to cast on a 120° C. stainless steel belt with a mirror finished surface. The extruded amounts were adjusted to form a final film with a total thickness of 7 μm consisting of 1.2 μm layer (the layer farthest from the belt), 4.0 μm layer and 1.8 μm layer in this order. The polymer solution laminate was conveyed for a while so as not to be allowed quenching and was then heated at first by air at 130° C. for two minutes and then by air at 170° C. for a minute, to evaporate the solvent, and the film capable of retaining its form was continuously removed from the belt, and introduced into water baths kept at 50° C. with an NMP concentration difference (positioned in descending order of concentration of NMP one after another), to extract the remaining solvent and the inorganic salts produced by neutralization. During the extraction, the film was stretched to 1.2 times in the longitudinal direction. Subsequently, the film was dried to remove water and heat-treated by a tenter, to obtain a 7 μm thick aromatic polyamide film. During the heat treatment, the film was stretched at 280° C. to 1.3 times in the transverse direction, dried and heat-treated at 250° C. for 1.5 minutes, and then gradually cooled at a rate of 20° C./sec.

Furthermore, the film was processed into a magnetic tape, and evaluated according to the methods described before. The results are shown in Table 1. Despite the existence of many large protuberances, their density itself was not very significant, and the S/N ratio, runnability and scratch resistance were all found to be insufficient.

TABLE 1

|  | Particles | | | | | | | | | | | |
|---|---|---|---|---|---|---|---|---|---|---|---|---|
|  | Average | | | Particle density | | | | | | | | |
|  | particle | Relative | | | | Minimal | Surface protrusions | | | Tape properties | | |
|  | size (nm) | standard deviation | dmax (nm) | ρ(dmax)/ρ(dmin) | ρ(dmax)/ρ(Dmax) | value (Note 1) | h (nm) | P/h | P1/3 (%) | S/N ratio (db) | Runna-bility | Scratch resistance |
| Example 1 | 180 | 0.52 | 40 | 9.0 | 2.5 | Existed | 40 | 0.57 | 9 | +2.3 | ○ | ◎ |
| Example 2 | 120 | 0.48 | 60 | 10.5 | 2.2 | Existed | 55 | 0.59 | 12 | +2.1 | ○ | ◎ |
| Example 3 | 180 | 0.54 | 30 | ∞ (Note 2) | 1.8 | Did not exist | 35 | 0.57 | 7 | +2.2 | ○ | ◎ |

TABLE 1-continued

| | Particles | | Particle density | | | | Surface protrusions | | | Tape properties | | |
|---|---|---|---|---|---|---|---|---|---|---|---|---|
| | Average particle size (nm) | Relative standard deviation | dmax (nm) | ρ(dmax)/ρ(dmin) | ρ(dmax)/ρ(Dmax) | Minimal value (Note 1) | h (nm) | P/h | P1/3 (%) | S/N ratio (db) | Runna-bility | Scratch resistance |
| Example 4 | 690 | 0.76 | 90 | 7.4 | 1.4 | Existed | 150 | 0.74 | 22 | +0.3 | ○ | ○ |
| Example 5 | 100 | 0.45 | 30 | 12.5 | 2.5 | Existed | 35 | 0.42 | 5 | +2.7 | ○ | ⊚ |
| Example 6 | 160 | 0.52 | 30 | 9.5 | 1.1 | Existed | 50 | 0.59 | 15 | +1.5 | ○–x | ⊚ |
| Example 7 | 170 | 0.52 | 120 | 6.2 | 1.3 | Did not exist | 40 | 0.61 | 10 | +1.7 | ○ | ○ |
| Comparative example 1 | 180 | 0.52 | <10 | 15.6 | 2.5 | Existed | 110 | 0.58 | 7 | −0.3 | ○ | x |
| Comparative example 2 | 180 | 0.53 | 100 | 2.2 | 1.1 | Did not exist | 25 | 0.57 | 17 | +2.5 | x | x |
| Comparative example 3 | 190 | 0.52 | 320 | 1.8 | 1.1 | Did not exist | 135 | 0.73 | 25 | −1.5 | x | x |
| Comparative example 4 | 200 | 0.54 | 120 | 2.1 | 1.5 | Existed | 40 | 0.68 | 27 | −1.0 | x | x |
| Comparative example 5 | 180 | 0.53 | 10 | 120 | 2.7 | Did not exist | 75 | 0.74 | 29 | −0.3 | x | x |

Note 1: Whether or not the minimal value of particle density exists in a thickness range from dmax to 1 μm.
Note 2: ρ(dmax)/ρ(d") = 7.5

We claim:

1. A polymeric film comprising a main component selected from the group consisting of an aromatic polyamide, an aromatic polyimide, and their mixtures, said film containing particles, having particle distribution characteristics, at least one surface portion of said film having particle distribution characteristics satisfying both of the following formulae:

$$10 \text{ nm} \leq dmax \leq 300 \text{ nm} \quad (1)$$

$$3 \leq \rho(dmax)/\rho(dmin) \leq 100 \quad (2)$$

where dmax is the depth from said surface of said film at which the particle density has a maximal value; dmin is the depth from the said surface of said film at which the particle density has a minimal or a minimum value in a range from dmax to 1 μm from said surface; and wherein ρ(d) is the particle density at each depth.

2. A film, which comprises a main component selected from the group consisting of an aromatic polyamide, an aromatic polyimide, and their mixtures, said film containing particles, having particle distribution characteristics measured from a surface portion of said film, said particle distribution characteristics satisfying the following formulae:

$$10 \text{ nm} \leq dmax < 300 \text{ nm} \quad (3)$$

$$3 \leq \rho(dmax)/\rho(d") \leq 100 \quad (4)$$

$$\rho(dmax)/\rho(dmin) > 100 \quad (5)$$

where dmax is the depth from a first surface of said film at which the particle density possesses a first maximal value; wherein dmin is the depth from the said first surface at which the particle density possesses a first minimal or first minimum value in a range from dmax to 1 μm from the said first surface; and wherein the linear differential coefficient of said particle density distribution curve has an inflection point at which the quadratic differential coefficient of said particle density distribution curve is a negative, which inflection point occurs at a depth d" which is deeper than dmax, and within a range between the depth at which ρ(d) is 4/5 of ρ(dmax), and dmin; and wherein ρ(d) is the particle density at each depth.

3. The film according to claim 1 or 2, wherein the average particle size of said particles contained in said film is in a range from 5 nm to 500 nm, and wherein the relative standard deviation of the particle size distribution of said particles is 0.7 or less.

4. The film according to claim 1 or 2, wherein at a depth Dmax from a second surface of the film opposite the first surface the particle density possesses a first maximal value of said particle density (if Dmax also satisfies the formulae (1) and (2) or the formulae (3) to (5), it is defined as ρ(dmax)≧ρ(Dmax), the following formula is satisfied:

$$\rho(dmax)/\rho(Dmax) \geq 1.2 \quad (6).$$

5. The film according to claim 1 or 2, wherein the average height h of surface protrusions formed on said first surface of the film, the relative standard deviation σ/h of the distribution of protrusion heights, and the ratio $P_{1/3}$ of the number of protrusions with heights of 1/3 or less of the average protrusion height h to the total number of protrusions satisfy the following formulae:

$$5 \text{ nm} \leq h \leq 100 \text{ nm} \quad (7)$$

$$\sigma/h \leq 0.7 \quad (8)$$

$$P_{1/3} \leq 20\% \quad (9).$$

6. The film according to claim 1 or 2, wherein there is a minimal value of particle density in a thickness range from dmax to 1 μm from the said first surface of the film.

7. The film according to claim 1 or 2, wherein the thickness of said film is about 6.5 μm or less.

8. The film according to claim 1 or 2, wherein said film is a single layer film or a laminate film suitable as a base film for a magnetic recording medium.

9. A magnetic recording medium comprising a magnetic layer formed on at least the said first surface of an aromatic polyamide and/or aromatic polyimide film according to claim 1 or 2.

10. A magnetic recording medium comprising a magnetic layer formed on a second surface opposite to the said first surface of a film according to claim 1 or 2.

11. A magnetic recording medium according to claim 9, which is a magnetic tape of 2.3 to 13.0 nm in width, 6.5 μm or less in film thickness, 100 m/coil or more in length and 8 kilobytes/mm² or more in recording density as a magnetic recording medium.

12. A magnetic recording medium according to claim 10, which is a magnetic tape of 2.3 to 13.0 mm in width, 6.5 μm or less in film thickness, 100 m/coil or more in length and 8 kilobytes/mm² or more in recording density as a magnetic recording medium.

* * * * *